United States Patent [19]
Smidtke

[11] Patent Number: 6,038,805
[45] Date of Patent: Mar. 21, 2000

[54] SCENT STEAMER

[76] Inventor: Richard D. Smidtke, 304 Tanyard Hollow Rd., Connellsville, Pa. 15425

[21] Appl. No.: 09/118,137

[22] Filed: Jul. 16, 1998

Related U.S. Application Data

[60] Provisional application No. 60/052,921, Jul. 19, 1997.

[51] Int. Cl.⁷ .................................................. A01K 29/00
[52] U.S. Cl. ........................................................ 43/1; 126/29
[58] Field of Search ................................. 43/1; 126/9 B, 126/29; 422/298

[56] References Cited

U.S. PATENT DOCUMENTS

| | | | |
|---|---|---|---|
| 1,284,299 | 11/1918 | Freeon | 126/29 X |
| 2,573,772 | 11/1951 | Nysten | 126/9 R X |
| 2,639,704 | 5/1953 | Gilchrist, Jr. | |
| 3,279,118 | 10/1966 | Allen | 43/129 |
| 4,771,563 | 9/1988 | Easley | 43/1 |
| 5,359,801 | 11/1994 | Mattucci | 43/1 |
| 5,361,527 | 11/1994 | Burgeson | 43/1 |
| 5,429,271 | 7/1995 | Porter | 43/1 X |
| 5,555,663 | 9/1996 | Burgeson | 43/1 |
| 5,842,463 | 12/1998 | Hall | 126/29 X |

Primary Examiner—Robert P. Swiatek
Attorney, Agent, or Firm—Jon M. Lewis, Esquire

[57] ABSTRACT

A scent steamer with collapsible upper and lower sections. The upper section holds bottles of liquid scent which are heated from the lower section, thereby causing the scents to vaporize in a slow manner into the surrounding environment.

8 Claims, 2 Drawing Sheets

SCENT STEAMER

This application claims priority to provisional application Ser. No. 60/052,921, filed Jul. 19, 1997.

BACKGROUND OF THE INVENTION

1. Field of the Invention

This invention relates generally to an apparatus designed to attract animals, preferably deer, by dispensing up to four different scents simultaneously. It may also be used as an animal repellent.

2. Description of the Prior Art

Animal scents are sold in almost any sporting goods store, hunting store, and general merchandise stores that sell sporting goods. One can go to the store and buy bottles of masking scents, scents that a doe is in estrus, buck scents, etc. Various methods and manners of dispensing scents have been used historically including placement of scents on cotton balls under the feet, walking with them. Other scent dispensers such as that which is disclosed in U.S. Pat. No. 5,359,801 to Mattucci combines a manner of heating scent by use of a propane burner and providing a reservoir for holding liquid. U.S. Pat. No. 5,429,271 to Porter discloses a heat operated scent dispenser wherein scent is poured into a reservoir. These scent steamers are not practical for many reasons including the need to pour scent in the reservoir and then clean it, only providing for the dispensing of one scent at a time for the most part and not being an easily collapsible conveying dispenser without cups, wicks or reservoirs to contend with.

SUMMARY OF THE INVENTION

It is, therefore, an object of the present invention to provide a scent steamer for dispensing animal scents.

It is the further object of the present invention to provide as a preferred embodiment a scent steamer which includes an upper section for holding bottles of scent and a lower section for providing a heat source for transfer of heat to the scent bottles which vaporize the scent.

It is the further object of the present invention to provide a scent steamer that is built in sections making it collapsible, one into the other, for easy transport.

It is the further object of the present invention to provide a scent steamer having a lower housing with a base for containment of a heat source such as a candle.

It is the further object of the present invention to provide an upper housing to be placed on the lower housing having a void dimension centrally placed for allowing the heat to radiate generally upward from the heat source.

It is the further object of the present invention to provide an upper section constituting a chimney with a heating platform constructed so as to be located directly above the described void and for containment of bottles of scent which are placed in direct contact with the heating platform.

It is the further object of the present invention to provide space within the chimney for a multitude of scent bottles allowing for a variety of scents to be contained in each bottle.

It is the further object of the present invention to enable a hunter to volatize a given scent attracting a doe in estrus and/or to mask a scent or volatize other like scents.

It is the further object of the present invention to allow a hunter discretion in use of the present invention in accordance with the prescribed local and other laws, conditions and safety precautions in effect at any given particular time.

It is the further object of the present invention to provide the hunter with a scent steamer which slowly disperses a one-ounce bottle and usually takes approximately 18 hours of time in said operation.

It is the further object of the present invention to provide a scented candle that may be used for added animal attractability.

It is the further object of the present invention to provide a scent steamer that is extremely quiet in operation, that breaks down into its component's parts readily, and more particularly, a scent steamer that is dismantled by blowing out the candle, removing the chimney, securing caps to the bottles of scent to seal same, removing the heating platform and placing all the various parts in the lower housing section for easy and simple storage and/or travel, all of which may be accomplished in approximately 45 seconds.

More specifically, the present invention is a scent steamer assembly for dispensing animal scents comprising a dimensioned upper housing for containment of a vaporization means for vaporization of said animal scents to an outside environment; a dimensioned lower housing in cooperation with said upper housing for containment of a heat source disposed to provide heat to said vaporization means.

These objects, as well as the other objects and advantages of the present invention will become apparent from the following description, in reference to the illustrations appended hereto.

BRIEF DESCRIPTION OF THE DRAWINGS

For a better understanding of the invention, reference may be had to the accompanying drawings in which.

DESCRIPTION OF THE PREFERRED EMBODIMENTS

Figure 1:
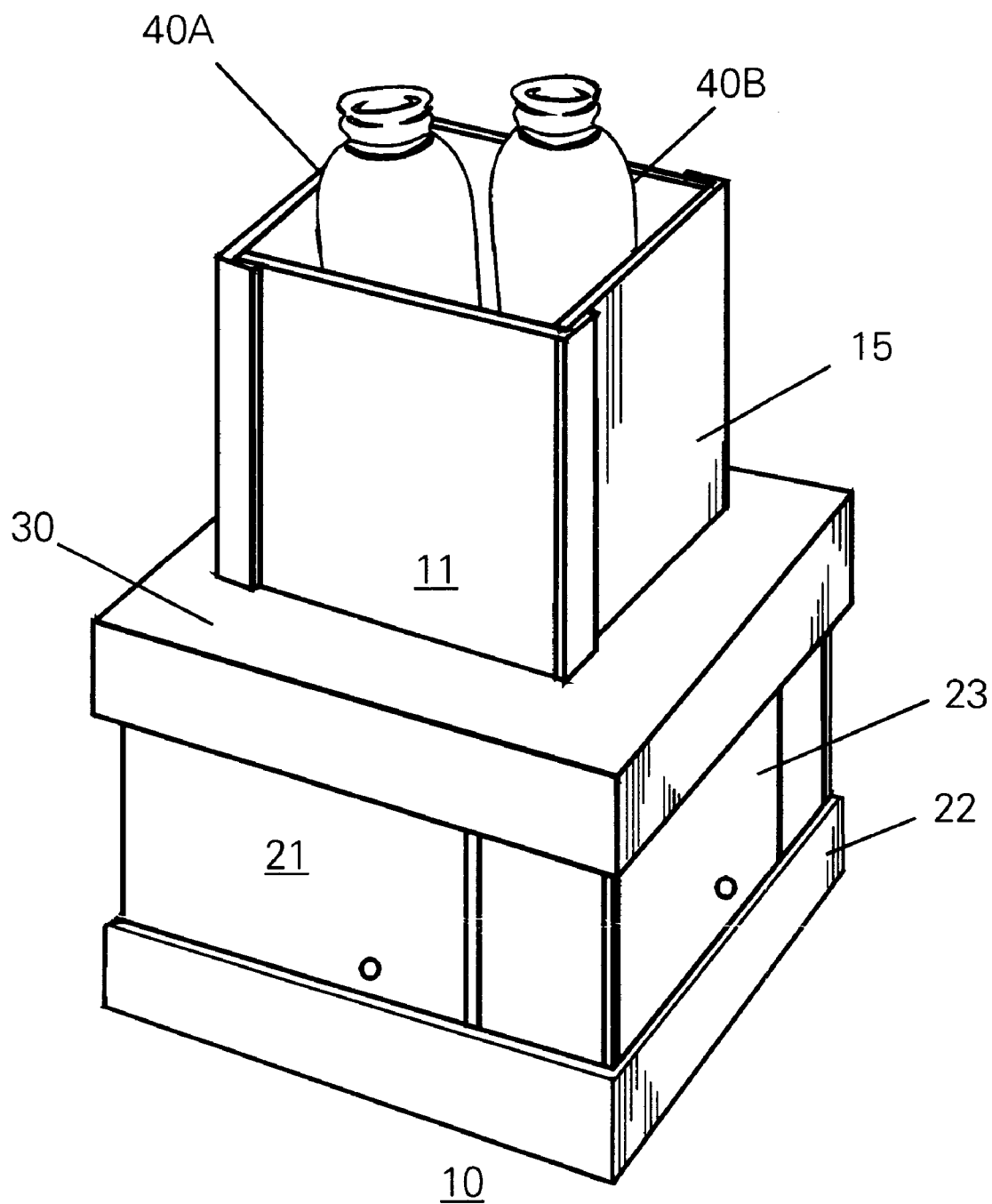
FIG. 1 is a perspective view of the present invention.

Referring to FIG. 1, a scent steamer assembly 10 is provided for volatizing animal scents as shown. The scent steamer has an upper section 11 and a lower section 21.

Figure 2:
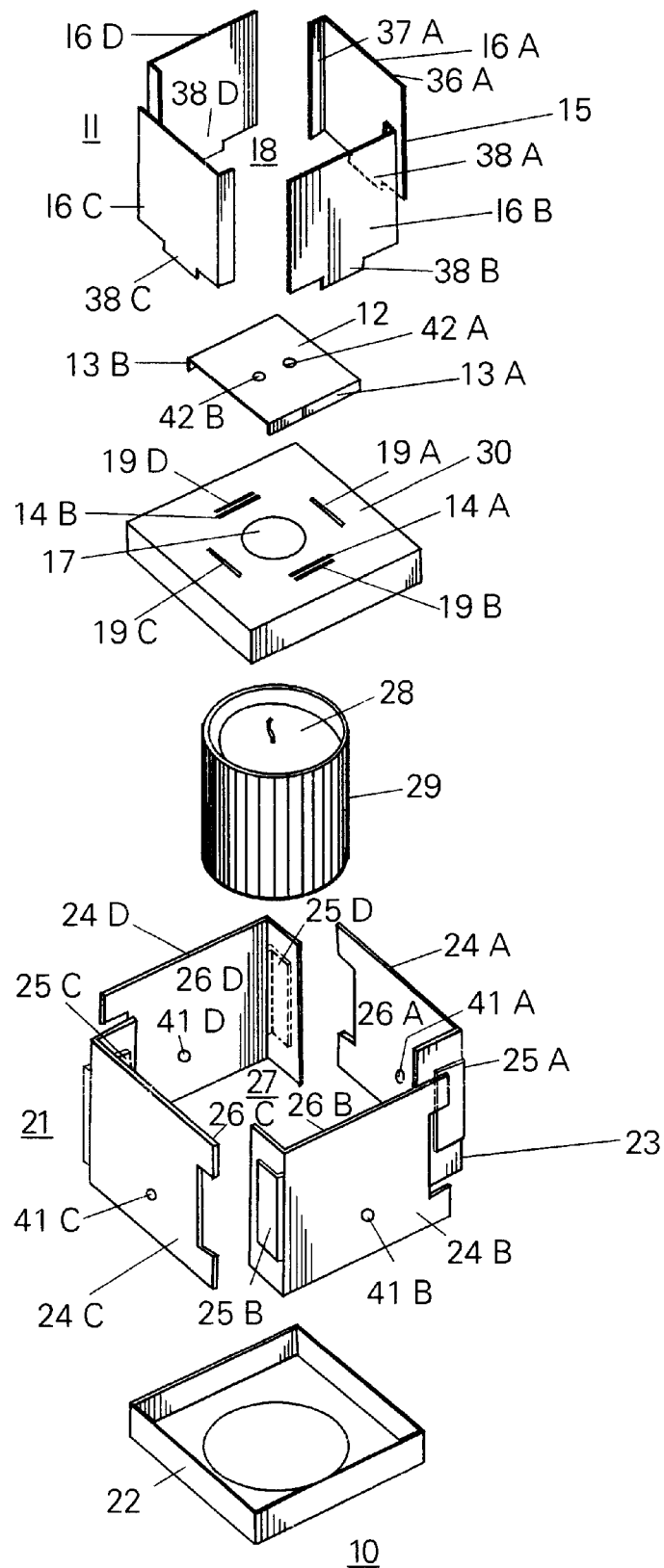
FIG. 2 is an exploded view of the present invention illustrating all of its various and specific parts.

Referring to FIG. 2, the lower section 21 consists of a base 22 and lower housing 23 comprising four lower sidewall panels 24A, 24B, 24C and 24D. Each lower sidewall panel 24A, 24B, 24C and 24D is respectively constructed with a coordinating ventilation aperture 41A, 41B, 41C and 41D allowing for oxygen to freely flow to a heat source, and in particular, candle 28. The lower sidewall panels 24A, 24B, 24C and 24D are dimensioned to fit into the base 22 and have coordinating slip joints 25A, 25B, 25C and 25D dimensioned respectively on one side of each lower sidewall panel 24A, 24B, 24C and 24D and are furthermore dimensioned to fit and contain the opposing side 26A, 26B, 26C and 26D of sidewall panels 24A, 24B, 24C and 24D. Sidewall panels 24A, 24B, 24C and 24D are generally dimensioned in order that their two legs as viewed from a top view are in perpendicular fashion, so that they fit firmly within each other. When sidewall panels 24A, 24B, 24C and 24D are installed within base 22, they define open cavity 27. A heat source such as candle 28 is placed in a can-like container 29 within cavity 27. However, any of a variety of heat sources may be selected like an oil wick, kerosene heat source, electrical heat source or the like.

Again referring to FIG. 2, top 30 is dimensioned to fit cooperatively to lower housing 23 wherein void 17 is centrally dimensioned within lower housing 23 to permit an unrestricted upward heat flow from any heat source, and in particular, candle 28.

Upper section 11 contains a heating platform 12 that is designed with heating slip joints 13A and 13B dimensioned respectively to fit within heating platform slots 14A and 14B located on a top surface of top 30. Heating pad ventilation apertures 42A and 42B are shown within heating platform 12 allowing oxygen and outside air to freely ventilate candle 28. The aforesaid provides for easy assembly and disassembly, yet maintains a very stable and safe heating platform.

Chimney 15 is placed and designed to surround heating platform 12 and is dimensioned appropriately to provide space 18 disposed centrally therein. Chimney 15 includes four chimney sidewalls 16A, 16B, 16C and 16D each of 16A, 16B, 16C and 16D containing as viewed from a top view an elongated surface leg 36A and a shortened support leg 37A which are typical to each and every other chimney sidewall 16B, 16C and 16D. Each chimney sidewall 16A, 16B, 16C and 16D is appropriately dimensioned with coordinating chimney slip joints 38A, 38B, 38C and 38D which respectively fit within chimney joint slots 19A, 19B, 19C and 19D for simple installation to a top surface of top 30. The chimney elongated surface leg 36A is perpendicular to the chimney shortened support leg 37A one to the other and dimensioned so that typically leg 36A slips within the next adjacent other side of chimney sidewall 16B for clear definition of void 17 on installed top 30 providing a firm rigid construction of chimney 15.

In operation, bottles of scent like 40A and 40B shown in FIG. 1 are placed on top of heating platform 12 after removing all lids from bottles of scent 40A and 40B. Candle 28 has previously been lit and provides by heat transfer a temperature rise to heating platform 12 which in turn transfers heat to the animal scents contained within bottles of scent 40A and 40B. In practice, it is found that it takes approximately 18 hours to completely volatize four one-ounce bottles of animal scent contained in bottles of scent 40A and 40B.

It is preferred that all labels are peeled from bottles of scent 40A and 40B. The final result is without any pouring, mixing or contamination containing or providing carriers of smelly liquid, the desired animal scents operate to their maximum efficiency and potential.

I claim:

1. A scent steamer assembly for dispensing animal scents comprising:

a dimensioned upper housing for containment of a vaporization means for vaporization of said animal scents to an outside environment wherein said upper housing comprises a plurality of interconnected, releasable upper sidewall panels adapted to fit into an upper housing base means, said upper housing base means disposed to transfer heat to said vaporization means, said vaporization means containing said animal scent, said upper housing constructed in order to create an open top allowing for said vaporization of said animal scent outward from said open top to said outside environment;

a dimensioned lower housing in cooperation with said upper housing for containment of a heat source disposed to provide heat to said vaporization means, wherein said lower housing comprises a plurality of interconnected, releasable lower sidewall panels adapted to fit into a lower housing base means, said lower housing base means functions to support said heat source on an upper surface of said lower housing base means, said lower housing base means further cooperates with said upper housing base means, whereby said upper housing base means comprises a top enclosure member having a centrally disposed void permitting upward unrestricted flow of said heat from said heat source through said void to said upper housing base means.

2. A scent steamer assembly according to claim 1, wherein said upper sidewall panels slideably fit into said upper housing base means, said lower sidewall panels pressfit into said lower housing base means.

3. A scent steamer assembly according to claim 2, wherein said heat source is disposed to cause said heat to be applied to said upper housing base means, enabling said transfer of said heat by conduction to said vaporization means.

4. A scent steamer assembly according to claim 3, wherein said scent steamer assembly is dismantled by removal of said vaporization means from said upper housing base means, disengagement of said upper sidewall panels, disengagement of said upper housing base means, disengagement of said top enclosure member from said lower housing and placement of said vaporization means, said upper sidewall panels, said upper housing base means and said top enclosure member into an open cavity of said lower housing.

5. A scent steamer assembly according to claim 4, wherein said heat source is a candle, and said vaporization means comprises a plurality of upwardly open holding means for containment of a corresponding plurality of said animal scents.

6. A scent steamer assembly according to claim 5, wherein said plurality of upwardly open holding means consists of uncapped bottles.

7. A scent steamer assembly according to claim 3, wherein said heat source is a candle.

8. A scent steamer assembly according to claim 3, wherein said vaporization means comprises a plurality of upwardly open holding means for containment of a corresponding plurality of said animal scents.

* * * * *